March 10, 1931. J. A. HYLE ET AL Re. 17,999

RAIL ANCHOR FOR RAILWAYS

Original Filed April 13, 1926

Inventors

Jacob A. Hyle,
Mark Franks,

By L. P. Woehaupter
his Attorney

Reissued Mar. 10, 1931

Re. 17,999

UNITED STATES PATENT OFFICE

JACOB A. HYLE, OF LOS ANGELES, CALIFORNIA, AND MARK FRANKS, OF CHICAGO, ILLINOIS, ASSIGNORS TO CONTINENTAL RAILWAY SUPPLY CORPORATION, A CORPORATION OF DELAWARE

RAIL ANCHOR FOR RAILWAYS

Original No. 1,608,318, dated November 23, 1926, Serial No. 101,637, filed April 13, 1926. Application for reissue filed May 29, 1930. Serial No. 457,459.

This invention pertains to novel improvements in one-piece rail anchors or anticreepers especially designed to be secured to the base portion of railroad track rails and in engagement with stationary parts of the road bed for the purpose of preventing longitudinal displacement of the rails during the travel of the rolling stock thereover.

The main object of the invention is to provide a novel, simple, economical, durable, practical and thoroughly efficient anchor from a single piece of high grade spring steel possessing maximum strength, which may be readily applied to the base of a track rail and securely retained in its proper operative position thereon, and which will always effectively grip the rail and cooperate with a stationary part of the road bed to prevent the track rail from creeping.

Another object of the invention is to so construct our improved device that it will always maintain an extremely effective and a firm frictional engagement with the track rail under all conditions of service.

Further objects of this invention are to so construct the novel rail anchoring device that it will successfully resist creeping of the track rail; that it may be removed and reapplied any number of times and always retain its effective tension and gripping power; that it furnishes the required bearing surface against the railroad tie and extends downwardly into the road ballast, and is so shaped at the point where it projects into the ballast that the vibration and wave motion of the rail will push the ballast apart so that it will not be in constant contact with said ballast thereby preventing interference with the railway electric signaling systems now employed.

The foregoing and such other objects as may appear from the ensuing description are accomplished by the construction, arrangement, location and combination of the parts hereinafter more fully described, illustrated in the accompanying drawings, and particularly pointed out in the claims appended hereto, it being understood that slight changes in the precise form, proportions and minor details of construction may be resorted to without departing from the spirit or sacrificing any of the advantages of the invention.

In the accompanying drawings forming a part of this specification it will be seen that:

In the embodiment of our invention as illustrated, the numeral 1 indicates a railroad track rail and 2 an underlying cross-tie forming a stationary part of the road bed and supporting the rail 1, the said rail having a tendency to creep, when subjected to the travel of the rolling stock thereover.

Figure 1:
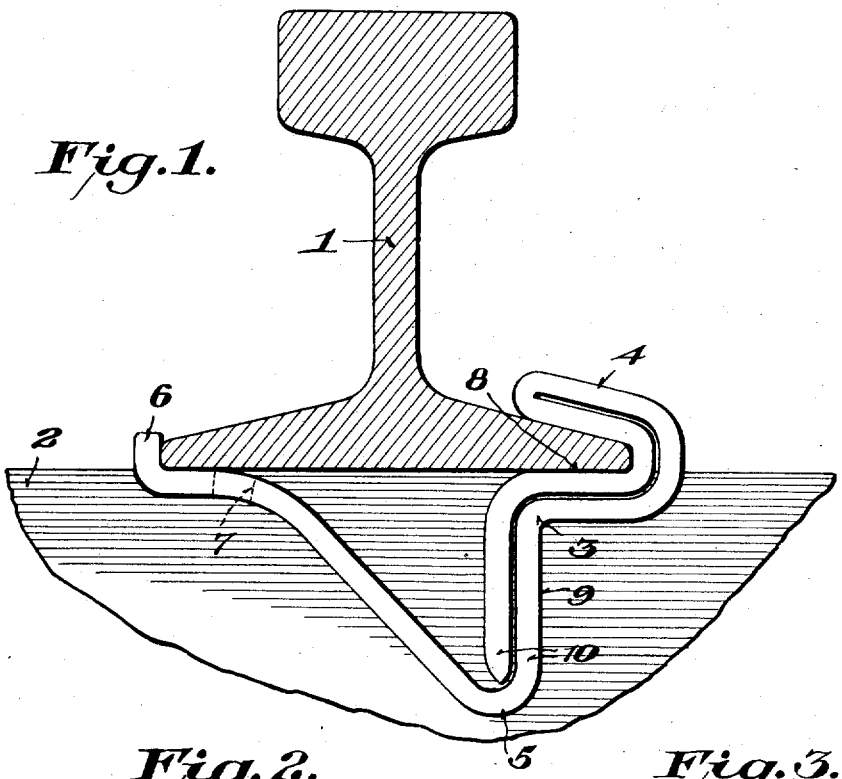
Fig. 1 is a side elevation of our improved device applied to a track rail, showing the track rail in cross-section and in side elevation a railway tie broken away.
Figure 2:
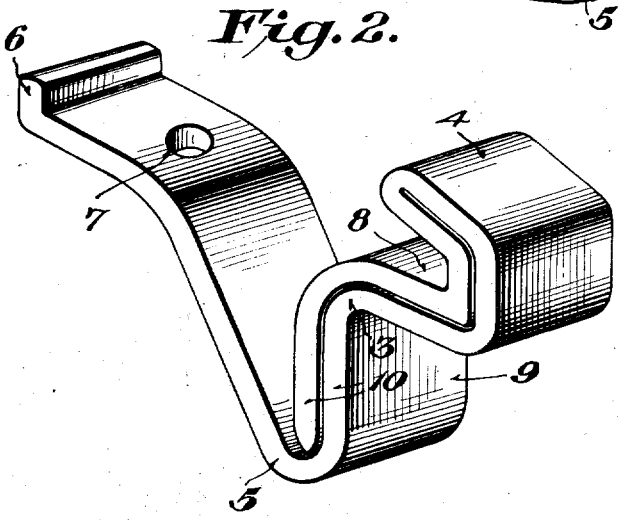
Fig. 2 is a perspective of the device detached from the rail.
Figure 3:
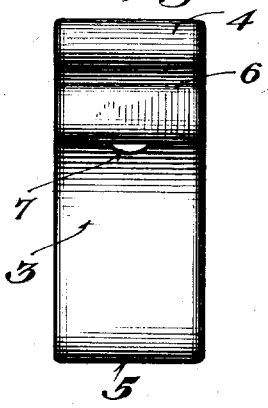
Fig. 3 is an end elevation thereof.

Our novel rail anchor 3 is formed from a single piece or flat bar of high carbon spring steel of the desired or required length, and may be of any desired thickness or width, preferably about one and a half inches wide and from one fourth to five sixteenths of an inch thick, one end portion, that is, the headed or jaw portion 4 being bent upon itself or doubled in the manner such as is clearly shown in Figs. 1 and 2, in order to furnish maximum strength with a minimum amount of steel, and said anchor may be formed by a suitable bending machine or drop forged.

The body portion of the anchor is formed with a downwardly extending V-shaped portion 5 adapted to rest and provide the desired bearing surface against the railway cross-tie 2, while its free outer end terminates with an upward extension 6 which is adapted to firmly and tightly grip one edge of the rail base, as shown in Fig. 1, and an opening 7 is formed therethrough for the purpose hereinafter described.

It will be perceived that this anchor is formed in such shape that the outer free end thereof normally extends in a horizontal plane above the level of the base portion 8 of the headed portion or jaw 4, so that when the anchor is adjusted to the track rail there will be continuous or constant high pressure upwardly by the end 6 against the lower surface of the rail. The distance between the inner face of the upward extension 6 and the portion of the jaw end for engaging the opposite edge of the rail base is less than the width of the rail base. Consequently it is necessary to increase the effective length of the under rail portion to engage the portion 6 over the edge of the rail base. This effective increase in the length of the body is obtained, preferably, by flexing the V-shaped portion transversely of the rail. Such transverse flexing may be produced by striking the outer face 9 of the portion 5 with a spike maul or by the use of a suitable tool applied to the opening 7 at the outer end of the portion 6. When the portion 6 clears the lower edge of the rail base, it is snapped upwardly by the resiliency of the anchor into locking engagement with the edge of the rail base so as to tightly clamp the edge of the rail base, and is maintained in such position owing to the high tension or pressure exerted by the special and particular construction of said anchor, and owing to the continuous upward pressure of its outer end portion there is no possibility of the anchor loosening or dropping off, from the excessive vibration which usually occurs during the passage of the rolling stock over the track rails.

In applying the anchor 3 to the rail 1, the anchor is first placed in its proper position with relation to the cross-tie with the inner end of its jaw or headed portion 4 in engagement with the upper and outer surface of the rail base, the portion 8 or lower jaw thereof engaging the lower corner of the rail base, and the body portion and free end portion resting beneath the bottom of the rail. Force is applied to the jaw end of the anchor to move the anchor bodily transversely of the rail. This movement of the anchor forces the jaw 4 upwardly on the inclined surface of the rail base and by reason of the contact of the lower jaw 8 with the lower corner of the rail, imparts a turning movement to the jaw end of the anchor, thus causing said outer end portion to be under a resilient upward tension. When the jaw end of the anchor has been forced to its fully applied position over one edge of the rail base the upward extension 6 rests beneath the rail in close proximity with the opposite edge of the rail base, when by imparting a holding blow, that is of sufficient strength to jar the double leaf spring formation 10 and thereby flex the V-shaped portion transversely of the rail, will cause the outer end portion 6 to immediately snap upwardly into tight contact with the edge of the rail base as shown. The resiliency of the under rail portion of the anchor together with the resiliency of the jaw end thereof maintains an intense grip or clamping action on the rail and permits the anchor to be removed and re-applied without impairing its holding qualities.

An opening 7 is formed through the body portion of the anchor, so that when it is desired to use the anchor at any place, such as on guard rails, frogs, and switches, or where there is any obstruction to prevent the anchor from being driven into its proper position by a pounding blow, a suitable tool may be connected with said opening and with the proper power applied thereto will cause the anchor to flex sufficiently to permit the outer end portion 6 to snap into tight contact with the edge of the rail base.

It will be understood that the bar of spring steel from which this anchor is made is heat treated, and while in highly heated condition it is bent upon itself forming the double leaf spring formation 10, the jaw or headed portion 4, the upward extension 6 is formed, and the opening 7 is punched therethrough. This construction provides the jaw end of the anchor with the desired strength and makes it less resilient than the locking end 6 of the anchor. The angle of the jaw portion 4 is normally smaller than the corresponding angle of the rail base, hence said jaw is sprung when forced into its proper operative position on the rail base, thus causing the said jaw to co-act with the double leaf spring formation to maintain an intense clamping action thereon, while the terminal of the leaf spring portion serves a reinforcement of the V-shaped portion, which is adapted to receive a blow for the final clamping action of the outer end of the anchor, and at the same time furnishes additional bearing surface for the anchor against the railroad tie.

It is well known that many rail anchors become loose after installation due to corrosion. However, in this particular construction there is always sufficient resiliency to compensate for such corrosion thereby insuring greater longevity.

Owing to the construction of this particular type of anchor it will be readily evident that the greater the tendency of the track rail to creep, the more intense will be the gripping action of this anchor to prevent the creeping, thereby insuring a practical and effective anti-creeper.

Regarding the appended claims defining the invention it is pointed out that where the expression "doubled resilient jaw portion" is employed in the claims, this has reference to the top and bottom jaw portions of the jaw designated generally as 4, irrespective of whether said jaw portions are composed of a single thickness of material or whether they are laminated or of double leaf-spring form, as manifestly the present rail anchor is equally new whether the bar of material from which the anchor is formed is or is not folded upon itself to provide a double leaf-spring formation at the end thereof that is bent to form the jaw 4. On the other hand, it is pointed out that where the expression "double leaf spring" is employed in the claims, this has reference to the folding of the bar of material upon itself to enhance the strength and the resiliency of the jaw 4.

Having thus described our invention what we claim and desire to secure by Letters Patent is:

1. A single piece rail anchor comprising a doubled resilient jaw portion forming an overlapping double leaf spring at one end, an upwardly extended portion at its other end, and a depending intermediate portion.

2. A single piece rail anchor comprising a bar of spring steel formed with an overlapping doubled leaf spring jaw portion at one end, an upward extension at its other end, and a depending intermediate portion adapted to contact with a railway tie.

3. A single piece rail anchor comprising a bar of spring steel formed with a double leaf spring, a resilient jaw at one end, an upward extension at its opposite end, and an intermediate depending portion.

4. A rail anchor of the character described, comprising a flat spring steel bar having one end bent upon itself to form a double resilient jaw portion, an upward extension at its other end, and an intermediate depending portion.

5. A rail anchor of the character described, comprising a flat spring steel bar having one end doubled over to form a double resilient jaw portion, an upward extension at its other end, and a V-shaped intermediate depending portion.

6. A rail anchor of the character described, comprising a doubled resilient jaw portion at one end, an upward extension at its other end, and an intermediate depending V-shaped portion.

7. An anti-creeper of the character described, comprising a flat steel spring bar having one end bent to form a double resilient jaw portion, an upward extension at its other end, and an intermediate depending V-shaped portion.

8. An anti-creeper of the character described, comprising a flat steel spring bar having one end bent upon itself to form a double resilient jaw portion, a double leaf spring formation, an upward extension at its other end, and an intermediate depending portion.

9. An anti-creeper of the character described, comprising a flat steel spring bar having one end bent upon itself to form a doubled jaw portion, an intermediate double leaf spring formation, an upward extension at its other end, and an intermediate V-shaped depending portion.

10. A rail anchor of the character described, comprising a flat steel spring bar having one end doubled to form a jaw portion, a double leaf spring formation, an upward extension at its other end, and a depending intermediate portion.

11. A rail anchor of the character described, comprising a flat steel spring bar having one end bent upon itself to form a doubled jaw portion, a double leaf spring formation, an upward extension at its other end, and a depending V-shaped intermediate portion with an opening formed through its body portion for the purposes set forth.

12. A one-piece rail anchor comprising a head portion having jaws respectively gripping the top and bottom of one base flange of the rail, and an under rail portion formed with terminal locking means for engagement with the outer edge of the other rail base flange; said under rail body portion being bent to provide two leg members one of which is positioned adjacent the head portion for exposure to pressure, from a hammer blow or its equivalent, to be transmitted substantially lengthwise of said other leg member thereby to increase its effective length and move said locking means into engagement with the rail flange subsequent to the full application of the head portion to the other rail flange.

13. A one-piece rail anchor comprising a head portion having jaws respectively gripping the top and bottom of one base flange of the rail and an under rail portion formed with terminal locking means for engagement with the outer edge of the other rail base flange; said under rail body portion being bent to provide two leg members divergently related, one of said leg members being substantially upright and positioned adjacent the head portion for exposure to pressure, from a hammer blow or its equivalent, to be transmitted substantially lengthwise of said other leg member thereby to increase its effective length and move said locking means into engagement with the rail flange subsequent to the full application of the head portion to the other rail flanges.

JACOB A. HYLE.
MARK FRANKS.